H. L. HUDSON.
GEAR.
APPLICATION FILED JULY 20, 1911.

1,043,012. Patented Oct. 29, 1912.

UNITED STATES PATENT OFFICE.

HARRISON L. HUDSON, OF CHICAGO, ILLINOIS, ASSIGNOR OF ONE-HALF TO WILLIAM H. LUTHARDT, OF CHICAGO, ILLINOIS.

GEAR.

1,043,012.  Specification of Letters Patent.  Patented Oct. 29, 1912.

Continuation of application Serial No. 617,958, filed March 30, 1911. This application filed July 20, 1911. Serial No. 629,560.

*To all whom it may concern:*

Be it known that I, HARRISON L. HUDSON, a citizen of the United States, residing at Chicago, in the county of Cook and State of Illinois, have invented a certain new and useful Improvement in Gears, of which the following is a full, clear, concise, and exact description, reference being had to the accompanying drawings, forming a part of this specification.

My invention relates to power transmission gears of that class in which the toothed portions are separated from but are movable with respect to the body portions and the invention is of particular service where sound insulating cushioning material is interposed between the toothed and body members of the gears to reduce or eliminate the noise due to gear operation.

Gears of this character, as hitherto constructed, are open to the objection that the toothed rings of the gears were capable of undesirable movement circumferentially with respect to the body portions of the gears upon sufficient change of the load to which the gear teeth were subject. By means of my invention such undesirable circumferential movement is guarded against, whereby the non-integral toothed ring and body portion of each gear may perform their functions substantially as though they were integrally formed, while at the same time the toothed ring is adapted to yield when encountering an unusual strain.

In the preferred embodiment of the invention, a guiding structure is provided which is made up of elements included in the formation of the toothed ring and body portion of the gear, whereby these two gear parts are interlocked or interengaged in such a manner as to prevent undesirable circumferential movement between these two gear parts. The toothed ring of the gear is flexible so that it may be forced out of its true shape when encountering unusual load, and is resilient so that it may automatically resume its true shape when the undue load is removed, the guiding means which I provide determining the direction in which the toothed ring may flex when subject to undue load and may return when resuming normal shape.

I will explain my invention more fully by reference to the accompanying drawing showing the preferred form thereof as it is embodied in an externally toothed spur gear, though it is to be understood that I do not limit myself to a spur gear, nor to a gear that is externally toothed.

Figure 1:
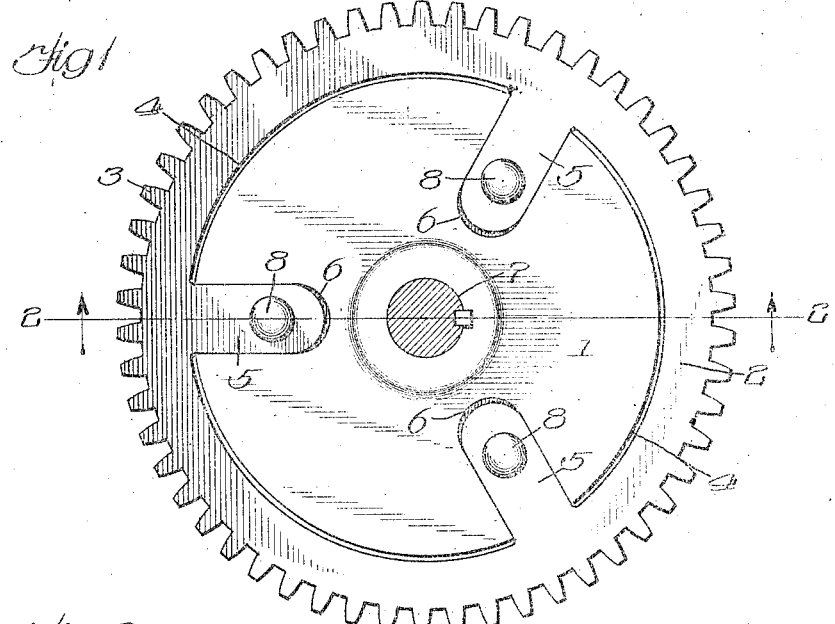
Figure 2:
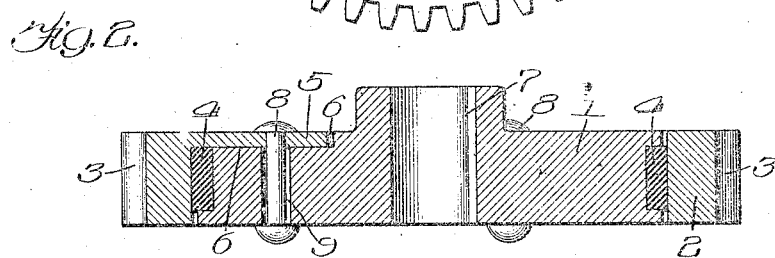
Figure 3:
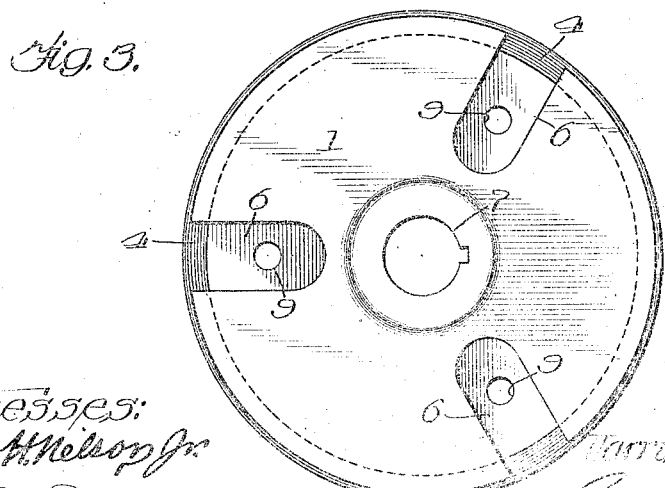

In the drawing, Figure 1 is a side elevation of a spur gear embodying the invention; Fig. 2 is a sectional view on line 2 2 of Fig. 1; and Fig. 3 is a view of the body portion of the spur gear unassociated with the toothed ring but having one form of cushion in place.

Like parts are indicated by similar characters of reference throughout the different figures.

In the embodiment of the invention illustrated, the body portion 1 of the gear is surrounded by a ring 2 which is provided with gear teeth 3 upon its outer periphery. The ring 2 is flexible so that it may be forced out of its true circular shape and is resilient so that it may automatically resume its proper shape. The cushion 4 is interposed between the body 1 and the ring 2, this cushion acting as a sound deadening or insulating element and being resilient to fill the changeable clearance between the elements 1 and 2. The cushion will yield to permit the toothed ring to move with respect to the axis of rotation of the body member 1 and transversely of such axis, the clearance between the members 1 and 2 of the gear being preferably just sufficient to permit the gear teeth of another gear that mesh with the gear teeth 3 to have their outer edges reach the pitch circle of the gear teeth 3, by which arrangement the gears will not become unmeshed although the toothed ring 2 is permitted to move away from the gear with which it is in mesh, when the teeth 3 encounter unusual opposition. The resilient cushion 4 is shown as being made in the form of a rubber band, but I do not limit myself to an annular cushion. In order to prevent undesirable circumferential movement of the members 1 and 2 with respect to each other, I provide a gear structure which preferably includes, in the case of spur gears, a plurality of insetting radially disposed fingers 5 in fixed relation with the ring 2 and which are received within radially disposed grooves 6 in the body portion 1 of the gear. Clearance normally intervenes between the inner ends of the grooves 6 and the inner ends of the radial fingers 5, which clearance is preferably not in excess of the clearance which normally intervenes between the members 1 and 2.

When the cushion 4 is compressed, the radial fingers 5 will move in the grooves 6, the clearance at the inner ends of the fingers 5 permitting said fingers to slide toward the axis of rotation of the gear as these fingers become interposed between the place of unusual pressure upon the teeth 3 and the shaft 7 upon which the body portion of the gear is keyed. The toothed ring being sufficiently flexible, the portion thereof that is immediately subject to unusual pressure or load is moved toward the body of the gear without accompanying undesirable circumferential motion owing to the guide structure which I have provided. When the unusual load has been removed the ring will automatically resume its proper shape due to its resiliency. Separation of the members 1 and 2 of the gear longitudinally of the axis of rotation of the gear is prevented by means of pins 8 which are provided with heads that engage the fingers 5 on one face of the gear and the body portion 1 upon the other face of the gear, the shanks of the pins passing through recesses 9 that are of sufficient size to permit the pins 8 to move therein as the fingers 5 slide with reference to the gear body 1. By the construction illustrated, movement between the members of the gear is substantially confined to radii extending from the center of the body portion of the gear, which center, in the embodiment of the invention shown, lies within the axis of the shaft 7. There is thus provided a certain fixed relationship between the shaft and the toothed ring 2 which will prevent undesirable circumferential movement between said shaft and ring, a result which is highly to be desired in the transmission of power.

Having thus described my invention, I claim as new and desire to secure by Letters Patent the following:—

1. A gear including spaced apart toothed and body members; a body of sound deadening material between said members and permitting movement between said members; and a guide structure having complemental portions that are provided upon said members, and which guide structure serves to define relative movement between said members transversely of the axis of rotation, the toothed member of the gear being of ring like formation and sufficiently flexible to permit it to be moved with respect to the body member of the gear at the part where unusual load is encountered and being sufficiently resilient to permit it to resume its proper shape when the undue load is removed.

2. A gear including spaced apart toothed and body members; and a guide structure having complemental portions that are provided upon said members, and which guide structure serves to define relative movement between said members transversely of the axis of rotation, the toothed member of the gear being of ring like formation and sufficiently flexible to permit it to be moved with respect to the body member of the gear at the part where unusual load is encountered and being sufficiently resilient to permit it to resume its proper shape when the undue load is removed.

3. A gear including spaced apart toothed and body portions that are relatively movable transversely of the axis of rotation; a body of sound deadening material between said portions and permitting movement between said portions; and a guide structure having complemental portions that are provided upon said gear portions, and which guide structure serves to define the relative movement between said gear portions transversely of the axis of rotation.

4. A gear including spaced apart toothed and body portions that are relatively movable transversely of the axis of rotation; and a guide structure having complemental portions that are provided upon said gear portions, and which guide structure serves to define the relative movement between said gear portions transversely of the axis of rotation.

In witness whereof, I hereunto subscribe my name this 13th day of July A. D., 1911.

HARRISON L. HUDSON.

Witnesses:
  E. L. White,
  G. L. Cragg.